US007487795B2

(12) United States Patent
Sand

(10) Patent No.: US 7,487,795 B2
(45) Date of Patent: Feb. 10, 2009

(54) CHEMICAL DISPENSER

(75) Inventor: William F. Sand, Cincinnati, OH (US)

(73) Assignee: Delaware Capital Formation, Cincinnati, OH (US)

( * ) Notice: Subject to any disclaimer, the term of this patent is extended or adjusted under 35 U.S.C. 154(b) by 126 days.

(21) Appl. No.: 11/133,044

(22) Filed: May 19, 2005

(65) Prior Publication Data

US 2006/0260704 A1 Nov. 23, 2006

(51) Int. Cl.
*G05D 11/03* (2006.01)

(52) U.S. Cl. .................................. 137/599.12; 137/889

(58) Field of Classification Search ..................... 137/1, 137/888, 889, 599.12
See application file for complete search history.

(56) References Cited

U.S. PATENT DOCUMENTS

| | | | | |
|---|---|---|---|---|
| 1,785,723 | A | 12/1930 | Boyd | |
| 2,719,704 | A * | 10/1955 | Anderson et al. | 137/889 |
| 2,881,800 | A * | 4/1959 | Bauerlein | 137/892 |
| 5,799,831 | A * | 9/1998 | Spriggs et al. | 137/889 |
| 6,240,953 | B1 * | 6/2001 | Laughlin et al. | 137/890 |
| 6,293,294 | B1 * | 9/2001 | Loeb et al. | 137/1 |
| 6,655,401 | B2 * | 12/2003 | Sand et al. | 137/889 |
| 2005/0051577 | A1 * | 3/2005 | Loeb et al. | 222/145.6 |

FOREIGN PATENT DOCUMENTS

| | | |
|---|---|---|
| GB | 2311333 | 9/1997 |

* cited by examiner

*Primary Examiner*—Stephen M Hepperle
(74) *Attorney, Agent, or Firm*—Wood, Herron & Evans, LLP

(57) ABSTRACT

An improved chemical dispenser includes a plurality of eductors for drawing chemical into a diluent to produce an effluent, each eductor of the plurality selectively discharging via a baffle tube into a single common discharge tube. The effluent flow parameters are insufficient to cause effluent from a selected eductor to flow into a chemical source coupled to a non-selected eductor, and are insufficient to draw chemical from a non-selected eductor into the effluent from a selected eductor.

3 Claims, 6 Drawing Sheets

CHEMICAL DISPENSER

FIELD OF THE INVENTION

This invention relates to chemical proportioners and dispensers and more particularly to dispensers for producing dilute streams or effluents of selective chemicals.

Dispensers are typically used to deliver a diluted chemical to a receptacle for use. Proportioners in the dispensers suck concentrated chemical into a diluent to produce a mixed effluent stream of diluted chemical in the diluent. Such uses include, for example, cleaning and sanitation where a concentrated chemical is diluted for use with a diluent such as water. The diluted mixture is dispensed from the proportioner to a bucket or bottle for example, where it can be used to clean a variety of surfaces.

BACKGROUND OF THE INVENTION

Such proportioners are typically based functionally on a device known in the industry by the term "eductor". As used herein, an eductor is a device based on the principle of a venturi and is used to draw a metered amount of one fluid or chemical into a flowing stream of another fluid, frequently called a diluent, and such as water. This produces a mixed water and chemical in a discharging diluted effluent. Basically, a venturi-type eductor comprises a major fluid or diluent flow path through which the diluent flows, at a velocity, to an orifice. The flow path in the eductor typically diverges or increases in cross-sectional dimension downstream from the orifice so that a pressure drop is attained in the downstream fluid emanating from the orifice. Such an area of divergence in the fluid path defined in the eductor can be referred to as a diffuser chamber or area. A chemical inlet port is disposed at or just downstream of the orifice in the flow path and in an area of the eductor which can be referred to as an injection area or chamber.

This chemical inlet port is operably connected to a selected chemical source. The reduced pressure in the diluent flow path at the chemical inlet port sucks chemical into the diluent where it is mixed in the diluent in the diverging flow path as the diluent flows downstream from the orifice in the diffuser chamber.

Thus, the chemical is "educted" or sucked into the diluent flow path in a ratio to the diluent which is dependent on the parameters of the chemical flow path to the chemical inlet port, the cross-sectional configuration of that port, the viscosity of the chemical, the velocity of the diluent and degree of pressure drop produced in the diverging flow path proximate and downstream of the diluent orifice.

While varied configurations of proportioners including such eductors have been used in dispensing diluted chemicals, they have been attended by certain operational and performance limitations. In order to understand these problems in detail, it is important to consider several operational parameters of the simple or typical eductors used in such proportioners as described above.

When a pressurized fluid or diluent such as water enters the eductor inlet, it is constricted toward the orifice. As the water passes the orifice, it becomes a high velocity jet stream. The increase in velocity through the injection chamber results in a decrease in pressure, thereby enabling a second fluid, such as a cleaning chemical, to be drawn into the injection chamber and diluent through the chemical inlet. As the water/chemical mix travels through the diffuser chamber, the velocity is reduced and it is reconverted into pressure energy but at a pressure level lower than the pressure at the orifice.

Such a prior eductor is diagrammatically shown for illustration purposes in FIG. 1.

Such eductors, when used in industry as injector or jet pumps, usually are submerged or have the diffuser below water level. On the other hand, eductors used in the chemical dispensing industry have diffusers which are not submerged or "flooded" at initial startup.

A typical eductor used in the chemical dispensing industry will nevertheless operate as described above if the following conditions are met:

1. The orifice diameter must be smaller than the diffuser diameter. A device with the diffuser being smaller than the orifice will cause positive pressure at the chemical inlet. This could cause the diluent fluid, and any other component therein, to back flow into the otherwise unadulterated chemical source in a reverse direction through the chemical inlet port.

2. The eductor must be allowed to "flood" at startup. This "flooding" causes the diffuser portion to fill with liquid thus reducing the velocity of the incoming fluid. If no "flooding", there is insufficient pressure drop to initiate and continue the necessary negative pressure to draw or suck chemical through the chemical inlet port into the injection chamber and the diluent fluid.

FIG. 2 shows a stream of water flowing through the typical non-flooded prior eductor of FIG. 1. The fluid flows through the orifice and continues undisturbed through the mixing chamber and diffuser from which it discharges to the atmosphere. Such a "non-flooded" eductor will not draw chemical through the chemical inlet, because the velocity of the water is not being reduced in the diffuser portion and injection chamber and there is no pressure reduction to initiate and then continue suction of the chemical through the chemical inlet port.

There are many ways that flooding can be accomplished. The Figures herein show several.

FIG. 3 shows a typical eductor having a discharge tube with a flooding ring located below the diffuser in the tube. In operation, water exits the orifice, travels through the diffuser and into the discharge tube where the stream impinges on a bar or other structure of the flooding ring. This causes the fluid to change direction, to back up and to cause a pressure drop. This floods the diffuser section, thus reducing the water diluent velocity. Pressure is reduced and this creates a vacuum at the chemical inlet.

In FIG. 4, a ramped deflector is added to the eductor to cause pressure drop in the diffuser section. Water in the stream impinges on the deflector. This interrupts the fluid jet from the orifice and causes the diffuser to "flood" so that a vacuum is created at the chemical inlet port.

Many schemes may be used to accomplish the flooding. The diffuser and orifice may be eccentric or the diffuser or orifice may be at an angle to one another.

The amount of back pressure in the diffuser portion of the eductor must also be controlled by the added water flow disruption feature. If the feature is not pronounced enough, then at low pressures the diffuser section will not flood. If the feature is too restrictive, there will be excessive back pressure and the eductor performance will be diminished. In extreme cases, if the flow is too high, there will be a positive pressure in the chemical inlet, in which case fluid will reverse flow through the chemical inlet.

Returning now to the function of proportioners used in the chemical dispensing industry, such as in dispensing diluted chemicals for cleaning purposes, and to enhance and facilitate a cleaning use, it is frequently desirable to provide mixtures of water and the same chemical in different dilute strengths or ratios.

In the past, a variety of selector valve and proportioner configurations have been used to these ends. Prior units have been, however, attended by certain operational and performance limitations as stated above. For example, cross-contamination by either residual chemicals in discharge passageways or by potential residual chemical intrusion into a feeding or discharge passageway of another chemical can contaminate the effluent.

One solution to this problem has been to provide independent and distinct proportioners for each chemical or dilute ratio with a separate discharge tube. Cross-contamination is reduced or eliminated, yet the number of discharge tubes is multiplied and the overall dispenser is large.

Another solution has been to use a single diluent valve feeding distinct chemical proportioners, or a single diluent input with a valve selectively coupling one of a plurality of chemical inlets to a single diluent stream or proportioner through varied flow regulating orifices to control the diluted mixture ratio. In some cases, a diluent flush channel is provided to cleanse internal passages of residual and undesirable chemicals precedent to a changeover. These features add parts, require space and cost, and complicate operations of the dispenser.

Accordingly, it is one objective of the invention to selectively provide dispensing of multiple chemicals or multiple chemical mixture ratios, or both, in a small package with no significant chemical contamination in any discharge.

A further objective of the invention has been to provide a proportioner for multiple chemicals or chemical ratios but in a small dilute proportioner apparatus.

A further objective of the invention is to provide a proportioner for multiple chemicals or chemical ratios flowing from a single discharge tube.

The use of a single discharge tube receiving mixture flow from multiple proportioners and eductors, however, is attended by a confining set of opposed performance parameters. On one hand, the flow parameters of one chemical cannot be such as to create a venturi effect as would draw chemical from chemical sources serving other proportioners discharging into the same tube. On the other hand, those parameters cannot create such back pressures as to pressurize non-selected proportioners with selected dilute chemical mixture in a way to contaminate the non-selected chemical source.

Accordingly, and stated in another way, if multiple eductors flow into one common discharge tube, there are at least two operational problems. On one hand, the pressures generated by one active eductor may be of such magnitude that the discharge back flows into one or more inactive eductors, contaminating the associated, non-selected chemical source. On the other hand, the pressures generated by one active eductor may be of such effect as to create a pressure differential sufficient to draw chemical from an inactive, non-selected chemical source, into the select dilute stream, thus contaminating it.

Thus, the objective of a proportioning dispenser for multiple chemicals or chemical ratios in a yet small proportioning device is difficult to attain.

It is, nevertheless, a further objective to provide an improved proportioner for producing multiple chemicals or chemical ratios from a common or single discharge tube without drawing non-selected chemicals into the diluent stream and without contaminating a non-selected chemical source by reverse diluent or selected chemical flow thereto.

SUMMARY OF THE INVENTION

To these ends, the invention meets these and other objectives with a unique combination of elements. According to one embodiment of the invention, at least two eductors flow into a single outlet or discharge tube. The structural and functional relationship of the diffuser channels from the eductors and respective intermediate baffle channels leading into the discharge tube is such that the discharge tube is not small enough to generate back pressure in the baffle channels and is of a size insufficient to create its own significant venturi effect within the baffle separated baffle channels and upstream diffuser channels.

In this way, a very compact overall proportioner structure is achieved with two or more eductors discharging into a common discharge tube, but with no likelihood of contamination intrusion into an inactive, non-selected eductor by undue pressure in the selected effluent, or from an inactive, non-selected eductor due to any venturi action or undesired by significant pressure drop.

In a more particular description of one embodiment of the invention, at least two eductors or proportioners are defined in a single, integral proportioner body downstream of a diluent selector valve which is operable to divert a diluent such as water to at least one of the eductors, thereby selecting it. The diluent flow through a chemical inlet area or injection chamber in an eductor draws chemical from a chemical source coupled to the eductor into the diluent stream. That effluent stream diffuses in a diffuser channel or passage, then enters a baffle passage defined in part by a baffle and in part by a proportioner body wall or baffle tube. The baffle also defines, on another side, another baffle passage for effluent from another inactive, non-selected eductor.

A common discharge tube is coupled to and serves both baffle passages downstream of the baffle passages at an end thereof for directing dilute chemical effluent mixtures to a receptacle.

The relationship of the diffuser chamber or channel and each baffle channel to the common discharge tube is such that there is insignificant back pressure of chemical mixture in the tube to force it into the baffle channel and diffuser channel leading from a non-selected eductor, and such that no venturi or "draw" is created at the end of the baffle, sufficient to draw chemical from the chemical source coupled to the non-selected eductor. The invention operates between these structural and functional parameters regardless of the number of eductors and baffle passages operationally coupled to the single, common discharge tube.

In one particular embodiment, the eductors are each provided with an outlet flooding chamber having structural features for creating sufficient turbulence and back pressure to flood the eductor and produce the necessary eductor pressure differentials required to draw chemical from the couple chemical source when the eductor is selected by the selective diversion to it of a diluent, such as water, introduced through a selector valve. One form of such structural feature is a flat floor extending across the outlet flooding chamber at least partially and perpendicularly. Another such feature is a tapered surface or ramp intruding into the outlet flooding chamber and deflecting the flow.

Finally, one complete embodiment of the dispenser according to the invention as noted above may thus include the following components or sub-components:

a. A proportioner body defining at lest two eductors, each operably connected to a chemical source and each operably connected to a single, common discharge tube from which an effluent of dilute chemical mixture from each eductor is dispensed;

b. Each eductor having a diffuser channel;

c. A dedicated baffle passage connected to each diffusing channel; and d. Each baffle passage operatively coupled to a single common discharge tube wherein the operational parameters and relationships between the diffuser channels, baffle passages and discharge tube are as described above.

In use, a selector valve can be used to direct a diluent stream to a selected eductor, the selector valve being supplied with diluent through an egap breaker or other back flow preventing device.

Multiple eductors can be defined in each proportioner body, with similar flow rate eductors each coupled to a single, common discharge tube.

Alternate embodiments of the invention contemplate varied sets of single or multiple eductors discharging an effluent of mixed diluent and chemical through one or respective common discharge tubes.

Thus according to the invention, multiple applications are contemplated. For example only, in a case where four eductors are defined in a unitary proportioner body, the operational geometry of eductors could be any combination of the following:

4 high flow eductors-0 low flow eductors;

3 high flow eductors-1 low flow eductor;

2 high flow eductors-2 low flow eductors; or 1 high flow eductor-3 low flow eductors.

One, two or more common discharges for these configuration sets as desired and one or more chemical sources could be used for proportioning or dispensing effluents at different rates, or of different chemicals.

The matrix of configuration of eductor sets, discharge tubes and chemical sources is thus widely varied so the invention can serve numerous applications and needs while reducing overall dispense size and eliminating effluent and chemical source contamination.

The invention thus contemplates the concept or process of dispensing one or more diluted chemical from a proportioner by selectively discharging a mixed diluent and chemical from at least two eductors into a common discharge tube under such conditions as will not over-pressure a non-selected chemical input and thus contaminate a non-selected chemical source, and as will not under-pressure a discharging effluent of mixed diluent and chemical so as to draw into a contaminate the mixed effluent with a non-selected chemical, all while providing a multiple chemical or multiple chemical ratio dispenser with a small overall configuration.

The benefits of the invention are many. There is no need for a water valve for each chemical eductor. There is no need for a back flow preventor for each of a series of water valves. All inductors are defined preferably in a compact, single proportioner body, producing a dispenser of very small size for its function capabilities. Only one discharge tube is necessary for varied chemical mixtures of similar flow rates. Water is diverted to the chemical, rather than the chemical being diverted to the water, thus eliminating or substantially reducing cross-contamination.

These and other objectives and advantages will become readily apparent from the following written description and from the drawings in which:

DETAILED DESCRIPTION OF SPECIFIC EMBODIMENTS

Figure 1:
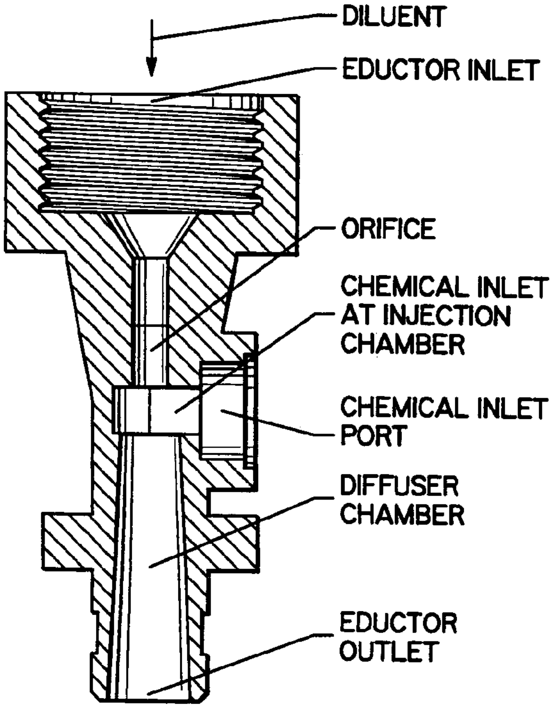
FIG. 1 PRIOR ART
FIGS. 1-4 illustrate various prior art eductors and their operation.
Figure 2:
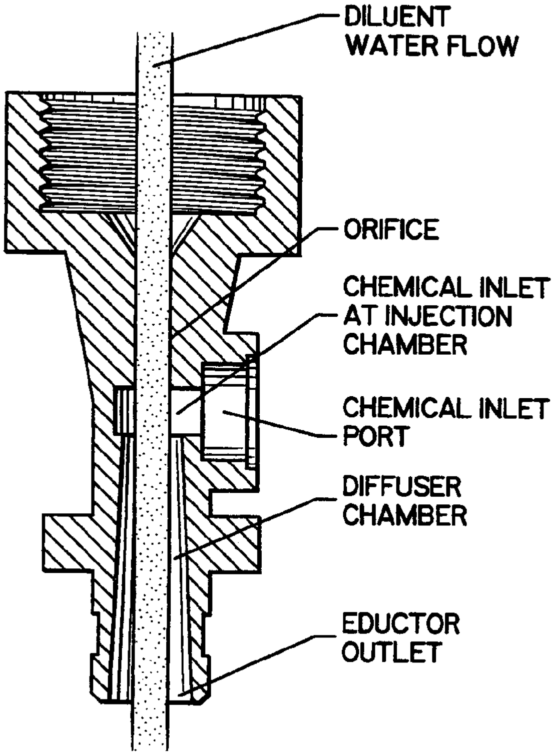
FIG. 2 PRIOR ART
Figure 3:
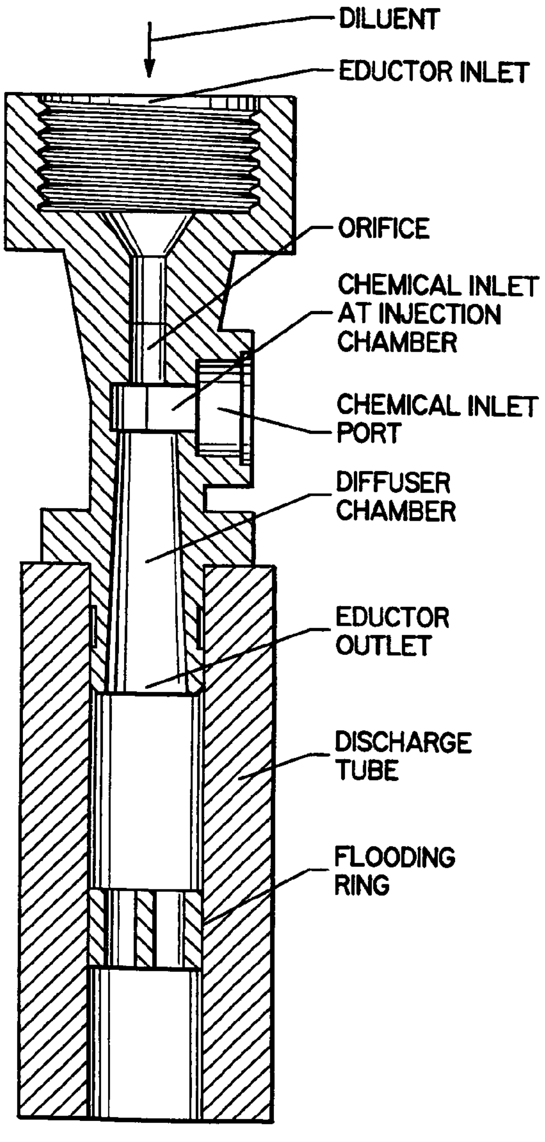
FIG. 3 PRIOR ART
Figure 4:
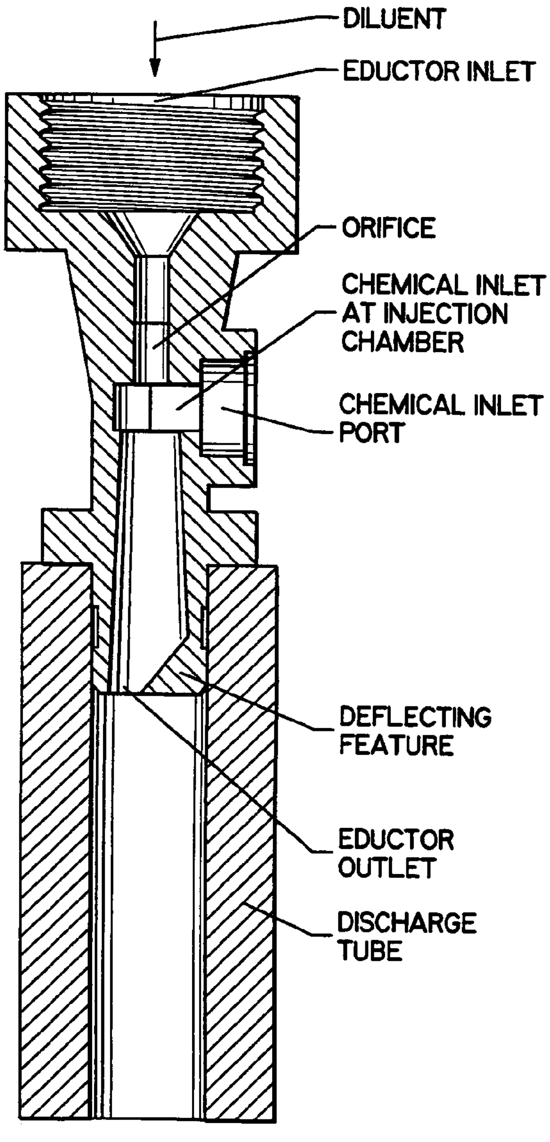
FIG. 4 PRIOR ART
Figure 6:
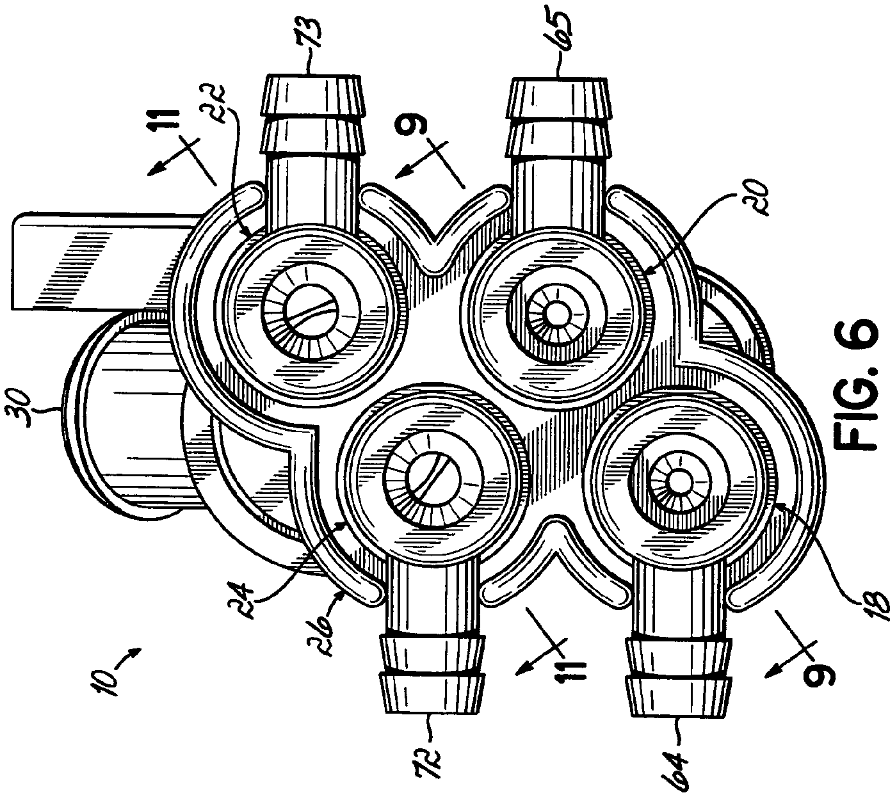
FIG. 6 is a perspective, top plan view of the proportioner of FIG. 5 with the diluent selector valve removed for clarity.
Figure 5:
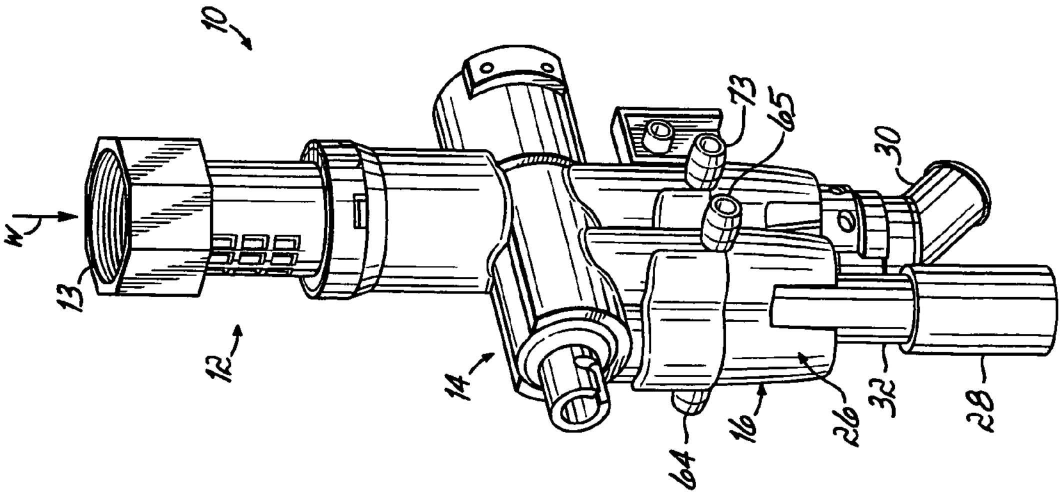
FIG. 5 is a perspective illustration of one embodiment of a proportioner according to the invention.
Figure 8:
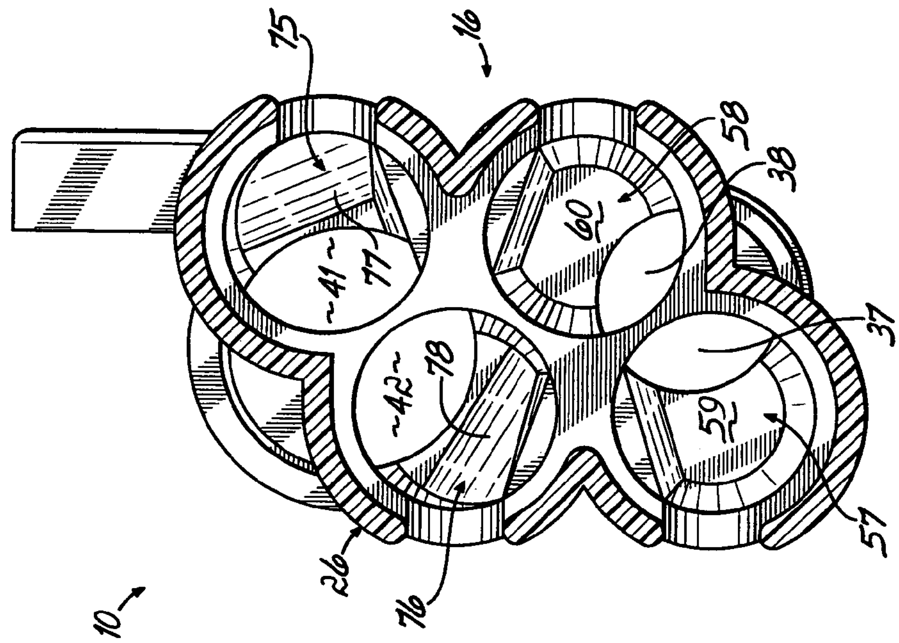
FIG. 8 is a top cross-sectional view taken along lines 8-8— of FIG. 7.
Figure 7:
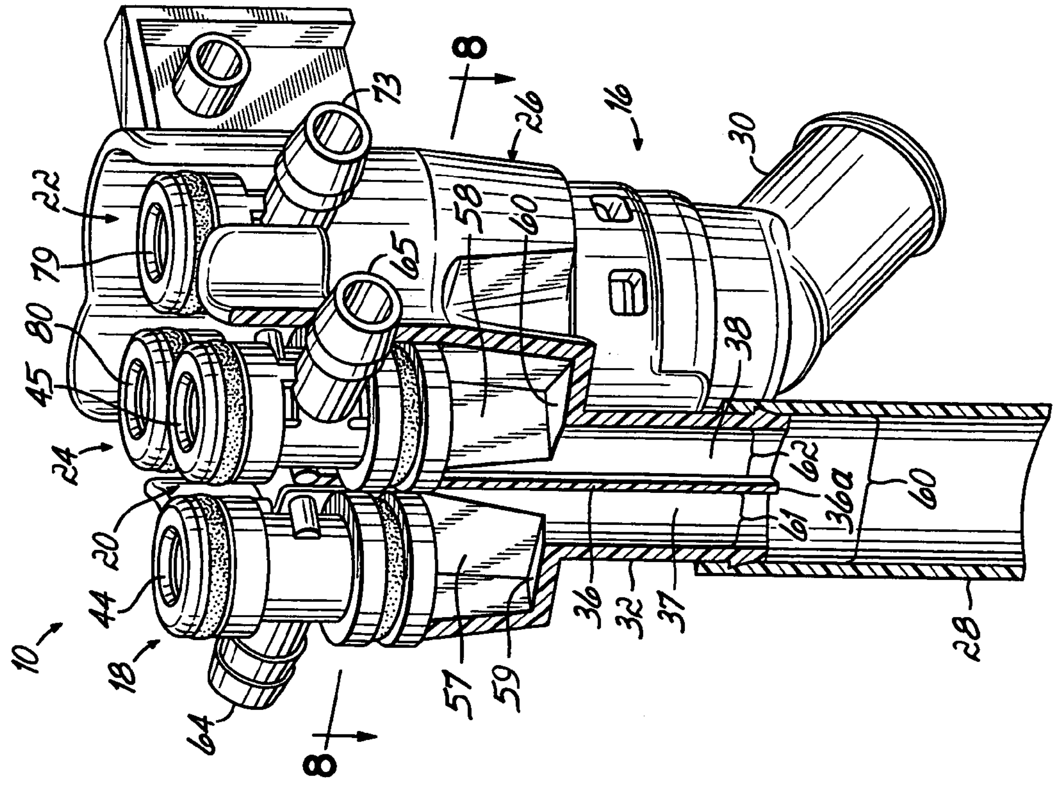
FIG. 7 is a perspective view of the eductor of FIGS. 5 and 6 illustrating in cut-away diffusion chambers for lower flow rate effluents.
Figure 10:
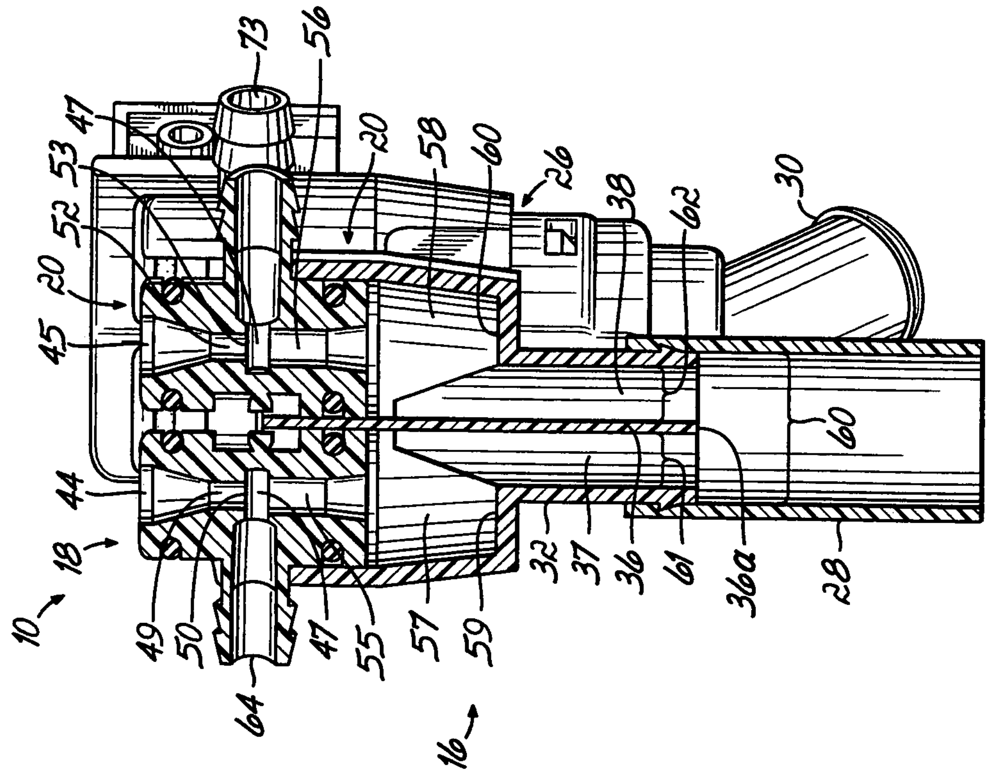
FIG. 10 is a view similar to FIG. 8 but more clearly illustrating the chemical inlet passages.

Turning now to the figures, and particularly to FIGS. 5-11, there is shown in the figures a dispenser or proportioner 10 according to the invention. As shown in FIG. 5, the dispenser 10 includes, at an upper end thereof, what is referred to as an air gap or egap eductor 12. Egap eductor 12 is any suitable eductor such as described in U.S. Pat. No. 6,634,376, incorporated herein be reference, and serves as a back flow preventor, preventing any back flow into the source of diluent.

The upper end of the egap eductor 12 is threaded as at 13 to receive a connector for conduit supplying a diluent such as water as illustrated by the arrow marked "W" in FIG. 5.

Water entering the egap eductor 12 passes therethrough to a selector valve 14, which may be of any suitable type for directing, selectively, water diluent into the inlets of any of the independent eductors as will be described. Both the egap eductor 12 and the selector valve 14 can be of any suitable configuration for receiving and selectively directing a flow of water diluent, for example, to the inlets of any of the multiple eductors as will further be described.

The proportioner further includes an integral proportioner body 16 in which are preferably defined two selectable low flow eductors 18, 20 and two selectable high flow eductors 22, 24. While the invention may be constructed to produce a variety of flow rates through selected eductors, it will be appreciated that one range of useful low flow is on the order of about one gallon per minute of diluent flow through eductors 18, 20. It will also be appreciated that while any range of flow might be used with the invention, one preferred form of the high flow eductors 22, 24 operate in the preferred range of about 4 gallons per minute. Other rates can be provided. Each of the eductors 18, 20, 22, 24 are defined in a single, integral, proportioner body 26, which is preferably integrally formed to house the various eductors. It will be appreciated that the proportioner body 10 may comprise or incorporate a variety of different or separate eductors, four being described in this embodiment by way of example only.

It will also be appreciated that, as further described and for descriptive purposes herein, one or more eductors may be "selected" by introducing a flow of diluent, such as water, into the inlet of a thus "selected" eductor.

As shown in the Figs., there are two discharge tubes extending from the proportioner body 26. These are tubes 28 and 30, which comprise respectively a common low flow discharge tube 28 and a high flow discharge tube 30. Low flow eductors 18, 20 are connected to and discharge into baffle tube 32 while high flow eductors 22, 24 also discharge into baffle tube 34. Baffle tube 32 may comprise an integral portion of proportioner body 26, or could be a separate tube. Baffle tube 32 includes a baffle 36 separating the tube 32 into two baffle passages 37, 38. Passage 38 leads from respective eductor 20 and passage 37 leads from eductor 18. A similar baffle tube 34 is operably located between, and coupled to, the high flow eductors 22, 24 on the one hand, and discharge tube 30 on the other hand. Baffle tube 34 is divided by the baffle 40 into two channels 41, 42, leading respectively and from eductors 22, 24 and operatively connected to and discharging into discharge tube 30.

Figure 9:
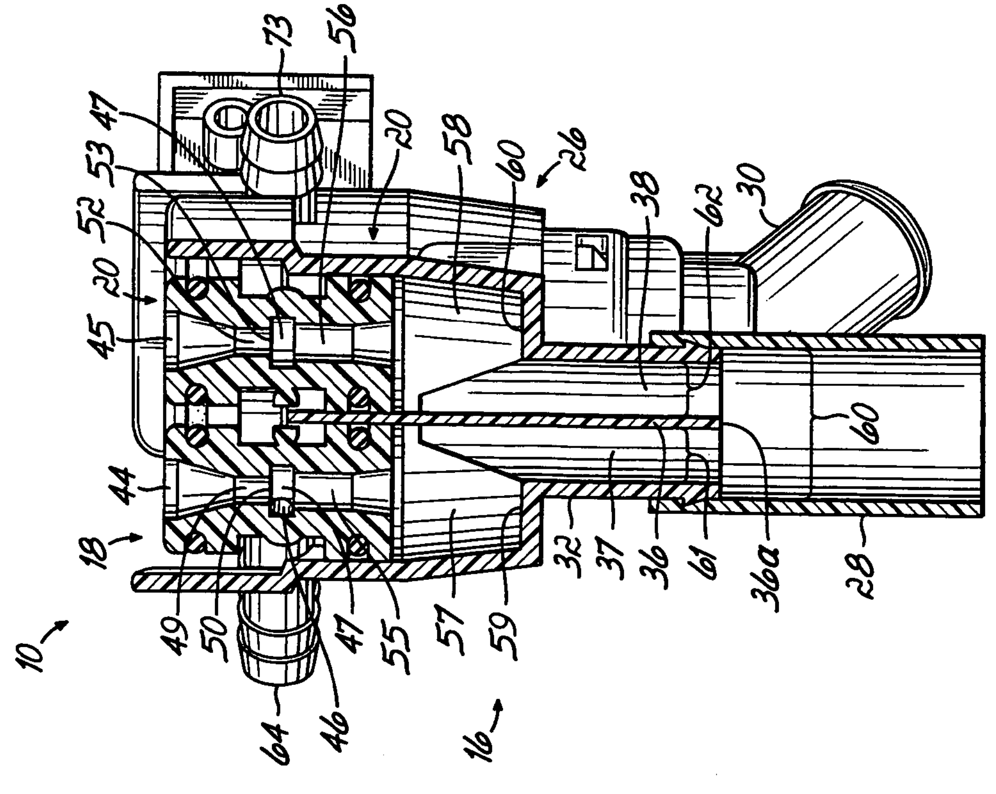
FIG. 9 is a elevational cut-away view of the proportioner taken along lines 9-9 of FIG. 6 in FIG. 7.
Figure 11:
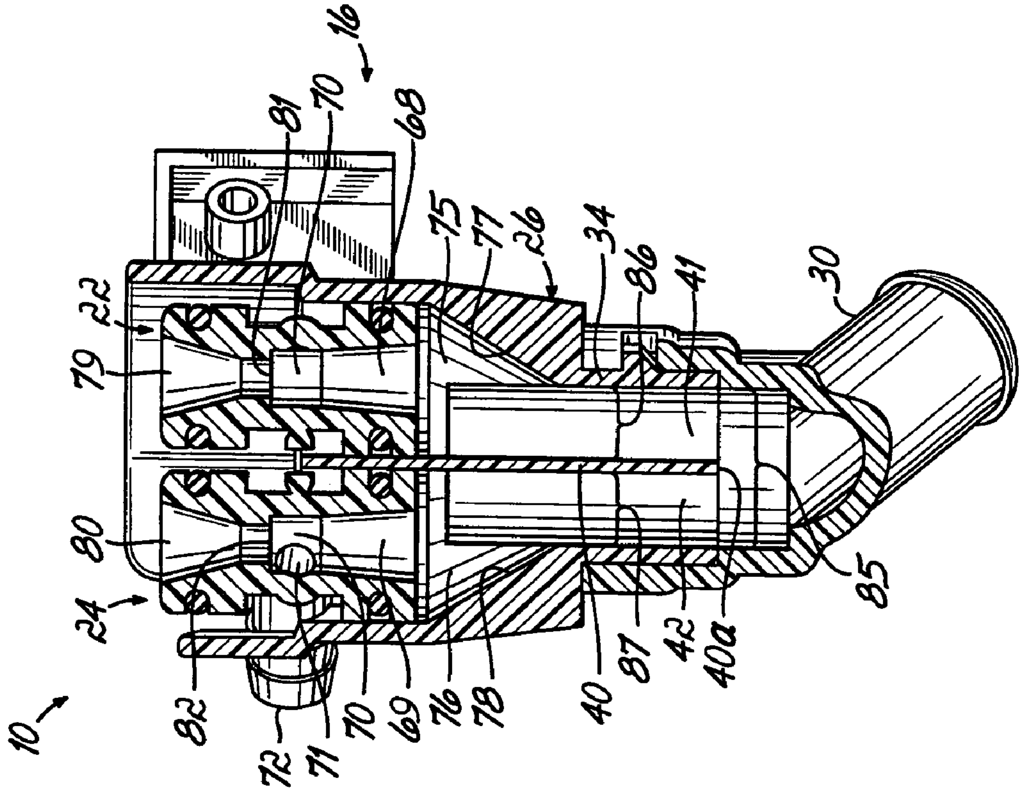
FIG. 11 is a view similar to FIG. 9 but showing details, in cut-away, of two diffusion chambers configured for higher flow rates, and taken along lines 11-11 of FIG. 6.

Each of the baffles 36, 40 have respective ends at 36A and 40A disposed as shown in the respective FIGS. 9 and 11.

Continuing now with the description of the dispenser 10, and with specific reference to FIG. 9, it will be appreciated that the eductor 18 includes an inlet 44 while eductor 20 includes an inlet 45 for selectively receiving a diluent such as water from any suitable selector valve such as illustrated diagrammatically in FIG. 5 at 14.

An eductor 18 includes a chemical inlet port 46 while eductor 20 includes a similar chemical inlet port (not shown in FIG. 9) in the injection area, illustrated as at 47 in FIG. 9. The eductor 18 includes a passage 49 of reduced cross-sectional flow area and terminating in an orifice 50. Likewise, eductor 20 includes a diluent passageway 52 of reduced cross-sectional flow area terminating in an orifice 53.

Each of the orifices 50, 53 respectively, terminate at or just upstream of the inlet ports 46 or the injection areas 47, which are present in each of the eductors 18, 20. Just downstream of the injection areas 47 is located a diffuser passage such as at 55, 56, as shown in FIG. 9, each being of greater cross-sectional area than the inlet passages at 49, 52. Diffuser passages or areas 55, 56 may be flared outwardly, as shown in FIG. 9, discharging into larger diffuser areas or channels such as at 57, 58, each of which have flat bottoms 59, 60.

At this point, it will be helpful to explain that as the water or diluent enter the inlets 44, 45, the velocity is increased in the passages 49, 52, and the water flow exits at orifices 50, 53 into chemical inlet areas 47 in both eductors. The diffuser passages or channels 55, 56 in the respective eductors are of greater cross-section than the cross-sectional flow area of the orifices 50, 53, whereby reduced pressure is created in the injection areas 47 to create a lower pressure area in those injection areas so as to draw into them any chemical operably coupled to the injection or chemical ports 46.

It will be appreciated that upon startup, the water flow through the inlets 44, 45 selectively, runs through the eductors 18, 20 and impinges on the flat surfaces 59, 60 respectively, for whichever eductor is selected, effectively flooding that eductor. The turbulence caused by that impingement causes water to back up in the diffuser channels 57, 55 for eductor 18 and 58, 56 for eductor 20, disrupting the water flow, reducing the water velocity and creating a pressure drop in the injection areas 47 to cause chemical to be sucked up into the diluent stream.

Thereafter, for whichever eductor 18 or 20 is selected, the mixed diluent and chemical flow into the baffle channels 37, 38 respectively, and from there into the discharge tube 28. It will be appreciated that the discharge tube 28 has a cross-sectional flow area 60 which is greater than either of the respective cross-sectional flow area 61 of baffle channel 37 or flow area 62 of baffle channel 38. As a result, the effluent flowing through either baffle channel 37 or baffle channel 38 is not at a pressure sufficient to pressurize the other or opposed non-selected channel coupled to the non-selected eductor.

For example, when low flow eductor 18 is selected by means of directing water into the inlet 44, water mixes with the chemical drawn through inlet port 46 and is discharged through baffle channel 37 into the discharge tube 28. The cross-sectional flow areas of the discharge tube 28 and that of the baffle channel 37 are insufficient to create enough pressure drop at the end 36A of the baffle, for example, to cause a negative pressure in the baffle channel 38 of the non-selected eductor 20, as would cause the eductor 20 to pull chemical into its injection area 47 from the chemical inlet associated with it.

At the same time, there is insufficient pressure produced in the baffle passage 37 and discharge tube 28 as would pressurize the baffle passage 38, leading from non-selected eductor 20, and cause water and mixed chemical to flow backwards into the eductor 20 and into the chemical source associated therewith.

In this regard, it will be appreciated that the eductor 18 is attached through a suitable connector 64 to an appropriate chemical source or reservoir (not shown), while the eductor 20 is attached through an appropriate coupling 65 associated therewith to an appropriate chemical source (not shown). The chemical sources which are not shown could be the same chemical sources with appropriate metering devices, such as orifices within the lines, so as to produce various ratios through the discharge tube 28 of mixed diluent and chemical. Alternately, the connectors 64, 65 (FIG. 6) could be connected to different chemicals so that each is selective dispensed, depending on which eductor 18, 20 is operatively coupled by the selector valve to an inflow of diluent.

It will also be appreciated that whatever chemical is associated with each eductor 18, 20, the effluent flow rates discharged from each are similar.

Turning now to FIG. 11, the higher flower eductors 22 and 24 operate in much the same way. These are only slightly varied, for example, in that the respective diffuser areas or channels 68, 69 flare outwardly as shown, immediately from the chemical injection areas 70 in both eductors. Chemical inlet port 71 is shown for eductor 24, while a similar port for eductor 22 is not shown in FIG. 11. The port 71, for example, is connected through a coupling 72 to an appropriate chemical source while the like inlet port for eductor 22 leading to the injection area 70 is connected to an appropriate chemical source through a coupling 73 (the chemical inlets or couplings for all the eductors being perhaps best seen in the plan view of FIG. 6).

The diffuser channels 68, 69 respectively lead into the diffusion areas 75; 76, each of which has a sloped wall 77, 78. The diffusion channels 75, 76 feed into respective baffle channels 41, 42, defined by baffle channel 40 and the baffle tube 34 or a passage in proportioner body 26. At the end of the baffle tube 34 indicated by the end of the baffle 40A, the discharge tube 30 is operably coupled to the respectively baffle channels 41, 42. These higher flow eductors 22, 24 operate somewhat similar to the eductors described already in FIG. 9.

For example, when diluent is selectively introduced to the inlets 79 of eductor 22 or inlet 80 of eductor 24, by the selector valve (not shown in FIG. 11), a stream of diluent such as water is concentrated to a higher velocity and is admitted through orifices 81, 82 respectively, into the chemical injection area 70 of the eductor selected. The stream of water initially flows through the selected diffuser channel 68, 69, until it engages or impinges on the sloped wall 77, 78, for whichever eductor is selected. The diluent then backs up into the respective diffuser channel 68, 69, whichever is selected, flooding the eductor and causing a drop in the velocity of the water through the injection areas 70. This, in turn, creates a pressure drop which causes chemical which is coupled to the chemical inlet or port feeding the particular eductor to be sucked up from the chemical source and into the diluent stream.

Thereafter, the mixed diluent and chemical flows into the coupled diffuser channels, for example, for eductor 22 through diffuser channel 68, 75 and into baffle channel 41. From there it is discharged into the discharge tube 30. The discharge tube 30 has a cross-sectional flow area 85 which is greater than the cross-sectional flow area 86 or 87 from the respective baffle channels 41, 42.

Accordingly, and similarly to the operation of the eductors shown in FIG. 9, when one or the other of the eductors 22, 24 is selected, say, for example, 22, there is insufficient pressure created by that operation through the baffle channel 41 to pressurize the system rearwardly through baffle channel 42 and introduce diluent and unwanted chemical into the chemical source operably connected to the coupling 72.

Likewise, the flow rate through the baffle tube 41 is insufficient to cause enough negative pressure in baffle 42, once the effluent passes the end of baffle 40A, to cause chemical to be drawn up through the coupling 72 for eductor 24, which would contaminate the chemical or ratio mix desired by the selection of proportioner or eductor 22.

In this embodiment, the eductors 22, 24 produce a higher flow rate than eductor 18, 20 facilitated by the sloped and less aggressive effluent deflector surfaces 77, 78.

The proportioner body 26 can be preferably made of any suitable material, such as any synthetic plastic or other suitable material with respect to the chemicals which will be used therewith.

It will be appreciated then, that for each of the eductors 18, 20, 22, 24, which may be independently selected by introducing diluent respectively thereto, sufficient diluent flow is utilized to entrain the chemicals associated with the chemical inlet port of that eductor to discharge an effluent through a discharge tube which is selectively shared with a similar flow eductor, but without causing such a back pressure in the baffle tube or single discharge tube as to pressurize the non-selected eductor and contaminate its chemical source and, as well, the flow parameters through the selected eductor are insufficient to cause a pressure drop at the end of the baffle tube, such as would draw chemical from the non-selected eductor into the effluent.

While one embodiment of the invention has been particularly disclosed, and that is a dispenser 10 having four different eductors, two for relatively high flow into one common discharge tube and two for relatively low flow into another common discharge tube, of either the same or different chemicals, many variations of the invention can be adapted to different applications. For example, a single proportioner having four high flow eductors flowing into one common discharge tube, but no low flow eductors, or some mix of the number of high flow eductors and low flow eductors into respective discharge tubes, common to eductors of similar flow rates, could be utilized without departing from the scope of the invention. And a variety of common discharge tubes, each connected preferably to one or more eductors producing similar flow rates, could be used.

The invention does contemplate, however, the discharge of at least two eductors, one of which is selected, into a common discharge tube wherein the effluent from each of the eductors is so operationally separated from the other eductor coupled to the common discharge tube, that the other eductor is not adversely pressurized, so as to contaminate its chemical source, or is provided with such a pressure drop as would suck a non-selected chemical into the discharging effluent.

These and other objectives and advantages will be readily apparent to those of ordinary skill in the art without departing from the scope of this invention and the applicant intends to be bound only by the claims appended hereto.

What is claimed is:

1. A dispenser for mixing a diluent and at least one chemical to form a mixed effluent and for discharging said effluent through at least one common discharge tube, said dispenser comprising:

at least two selectable eductors;

each of said eductors operatively coupled to at least one chemical source for drawing chemical into a diluent, selectively passing through each said eductor;

a common discharge tube;

each eductor operatively coupled to said common discharge tube;

each eductor selectively discharging an effluent of mixed chemical and diluent into said common discharge tube operatively connected to each of said eductors;

discharge of effluent from a selected eductor being insufficient to cause flow of effluent from a selected eductor to a chemical source coupled to a non-selected eductor and being insufficient to draw chemical from a non-selected eductor into said effluent;

said dispenser further including a second discharge tube and wherein at least a third eductor is constructed to produce a different effluent flow rate than said at least two eductors, said third eductor operably connected to said second discharge tube; and wherein each eductor includes an effluent deflecting member for causing flooding of each eductor upon passage of a diluent therethrough and wherein the effluent deflecting member of said at least two eductors varies in shape from the effluent deflecting member of said third eductor.

2. A dispenser as in claim 1 wherein each baffle passage has a cross-sectional flow area, wherein said common discharge tube has a cross-sectional flow area, the ratios of cross-sectional flow area of said discharge tube to that of each respective baffle passage being such that effluent flow from a selected eductor into said discharge tube is insufficient to cause a pressure drop in a baffle passage coupled to a non-selected eductor drawing chemical into said effluent from a non-selected eductor.

3. A dispenser as in claim 2 wherein the ratios of said cross-sectional flow of said discharge tube to the cross-sectional flow area of said baffle passages is such that insufficient pressure is created by effluent flow from a selected eductor to force effluent from a selected eductor into the chemical source coupled to a non-selected eductor.

* * * * *